US008869928B2

(12) United States Patent
Yoshida et al.

(10) Patent No.: US 8,869,928 B2
(45) Date of Patent: Oct. 28, 2014

(54) CONSTRUCTION MACHINE

(75) Inventors: Hajime Yoshida, Omihachiman (JP); Hajime Ishii, Higashiomi (JP); Shuuhei Noguchi, Higashiomi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/005,898

(22) PCT Filed: May 24, 2012

(86) PCT No.: PCT/JP2012/063349
§ 371 (c)(1),
(2), (4) Date: Sep. 18, 2013

(87) PCT Pub. No.: WO2012/172951
PCT Pub. Date: Dec. 20, 2012

(65) Prior Publication Data
US 2014/0008140 A1 Jan. 9, 2014

(30) Foreign Application Priority Data
Jun. 14, 2011 (JP) ................................. 2011-132354

(51) Int. Cl.
*B60W 10/06* (2006.01)
*E02F 9/20* (2006.01)
(Continued)

(52) U.S. Cl.
CPC ........... *E02F 9/2025* (2013.01); *F01N 2590/08* (2013.01); *F01N 2560/14* (2013.01); *F01N 2430/00* (2013.01); *F01N 2560/06* (2013.01); *F01N 13/02* (2013.01); *F01N 2900/1406* (2013.01); *F02D 41/029* (2013.01); *E02F 9/2095* (2013.01); *F01N 9/002* (2013.01); *E02F 9/2246* (2013.01); *E02F 9/2285* (2013.01); *E02F 9/2296* (2013.01); *F01N 2330/06* (2013.01); *F02D 31/008* (2013.01); *F01N 2900/08* (2013.01); *E02F 9/2066* (2013.01); *F01N 13/0097* (2014.06); *F01N 3/103* (2013.01); *F01N 3/0821* (2013.01);
(Continued)

(58) Field of Classification Search
USPC ...................... 180/305, 306, 307, 309; 60/285
See application file for complete search history.

(56) References Cited

U.S. PATENT DOCUMENTS 4,662,172 A * 5/1987 Shinzawa et al. ............... 60/303
4,719,751 A * 1/1988 Kume et al. ..................... 60/285
(Continued)

FOREIGN PATENT DOCUMENTS

EP          1 582 714 A1    10/2005
JP         2005-291036 A    10/2005
(Continued)

*Primary Examiner* — Jeffrey J Restifo
(74) *Attorney, Agent, or Firm* — Mattingly & Malur, PC

(57) ABSTRACT

A regeneration apparatus for executing a regeneration process to an exhaust gas purifying apparatus and an engine control device that controls a rotational speed of an engine according to an instruction value by a rotational speed instruction apparatus are provided. When a directional control valve is in a neutral position, the engine control device controls the rotational speed of the engine to an automatic idle rotational speed (Nai) by an automatic idle selection unit regardless of the instruction value. However, when it is determined that the regeneration process of the exhaust gas purifying apparatus is executed in a state of controlling the rotational speed of the engine at the automatic idle rotational speed (Nai), the engine control device increases the rotational speed of the engine to a regeneration processing rotational speed (N1) higher than the automatic idle rotational speed (Nai).

5 Claims, 8 Drawing Sheets

(51) Int. Cl.
    *F01N 13/02*     (2010.01)
    *F02D 41/02*     (2006.01)
    *F01N 9/00*      (2006.01)
    *E02F 9/22*      (2006.01)
    *F02D 31/00*     (2006.01)
    *F01N 13/00*     (2010.01)
    *F01N 3/10*      (2006.01)
    *F01N 3/08*      (2006.01)
    *F01N 3/023*     (2006.01)
    *F02D 41/08*     (2006.01)

(52) U.S. Cl.
    CPC ..... *F01N 2900/1606* (2013.01); *F01N 2240/36* (2013.01); *F01N 3/0231* (2013.01); *F02D 41/08* (2013.01); *F01N 2430/06* (2013.01); *F01N 3/0235* (2013.01); *F01N 2900/0601* (2013.01); *Y02T 10/47* (2013.01); *F01N 2900/1404* (2013.01); *F01N 2560/08* (2013.01)
    USPC .............................. 180/309; 180/305; 60/285

(56) References Cited

U.S. PATENT DOCUMENTS

| | | | | |
|---|---|---|---|---|
| 4,835,964 | A * | 6/1989 | Kume et al. | 60/285 |
| 5,492,190 | A * | 2/1996 | Yoshida | 180/65.245 |
| 5,566,774 | A * | 10/1996 | Yoshida | 180/65.245 |
| 5,934,396 | A * | 8/1999 | Kurita | 180/65.25 |
| 6,434,928 | B1 * | 8/2002 | Manaka | 60/274 |
| 6,588,205 | B1 * | 7/2003 | Kumagai et al. | 60/298 |
| 7,654,076 | B2 * | 2/2010 | Wills | 60/274 |
| 7,827,784 | B2 * | 11/2010 | Matsubara et al. | 60/297 |
| 8,096,382 | B2 * | 1/2012 | Kamiya et al. | 180/277 |
| 8,356,472 | B2 * | 1/2013 | Hiranuma et al. | 60/286 |
| 8,459,008 | B2 * | 6/2013 | Kamiya et al. | 60/285 |
| 8,474,243 | B2 * | 7/2013 | Kocher et al. | 60/286 |
| 8,631,643 | B2 * | 1/2014 | Farman et al. | 60/285 |
| 8,651,219 | B2 * | 2/2014 | Yoshida et al. | 180/305 |
| 2008/0104942 | A1 * | 5/2008 | Wills | 60/274 |
| 2008/0173009 | A1 * | 7/2008 | Kocher et al. | 60/286 |
| 2010/0089035 | A1 * | 4/2010 | Kamiya et al. | 60/277 |
| 2013/0283769 | A1 * | 10/2013 | Watanabe et al. | 60/274 |
| 2014/0008140 | A1 * | 1/2014 | Yoshida et al. | 180/309 |
| 2014/0138177 | A1 * | 5/2014 | Yoshida et al. | 180/307 |

FOREIGN PATENT DOCUMENTS

| | | |
|---|---|---|
| JP | 2009-79500 A | 4/2009 |
| JP | 2010-065577 A | 3/2010 |

\* cited by examiner

CONSTRUCTION MACHINE

TECHNICAL FIELD

The present invention relates to a construction machine provided with an exhaust gas purifying apparatus that is used suitably for removing harmful substances from an exhaust gas in a diesel engine, for example.

BACKGROUND ART

In general, a hydraulic excavator that is represented by a construction machine is constituted by an automotive lower traveling structure, an upper revolving structure that is mounted to be capable of revolving on the lower traveling structure and a working mechanism that is liftably provided in a front side of the upper revolving structure. The upper revolving structure is provided with an engine mounted thereon in a rear part of a revolving frame for driving a hydraulic pump, and is provided with a cab, a fuel tank and an operating oil tank thereon in a front side of the revolving frame.

Here, a diesel engine is generally adopted as an engine that is a prime mover of the hydraulic excavator. There are some cases where harmful substances made up of, for example, particulate matter (PM) and nitrogen oxides (NOx) are contained in an exhaust gas that is discharged from this diesel engine. Therefore, the construction machine that is represented by the hydraulic excavator is provided with an exhaust gas purifying apparatus in an exhaust pipe forming an exhaust gas passage of the engine.

This exhaust gas purifying apparatus is provided with a post-treatment device comprising an oxidation catalyst unit (generally called a diesel oxidation catalyst, DOC in short) that oxidizes, for example, nitrogen monoxide (NO), carbon monoxide (CO) and hydrocarbon (HC) contained in an exhaust gas for removal, a particulate matter removing unit (generally called a diesel particulate filter, DPF in short) that is arranged downstream of the diesel oxidation catalyst and traps the particulate matter in the exhaust gas for removal, and the like (Patent Document 1).

PRIOR ART DOCUMENT

Patent Document

Patent Document 1: Japanese Patent Laid-Open No. 2010-65577 A

SUMMARY OF THE INVENTION

Incidentally, in the aforementioned conventional art, for example, when a filter in the particulate matter removing unit is clogged, fuel injection for a regeneration process that is called post-injection is performed for regenerating this filter, thus increasing a temperature of the exhaust gas. Therefore, the particulate matter that is deposited in the filter is made to burn by a high-temperature exhaust gas caused by the post-injection, so that the filter is processed to be regenerated. However, the regeneration process of the filter using this post-injection is generally called high-temperature regeneration, which is desired to be further improved because in some cases the temperature of the exhaust gas reaches a temperature higher than necessary, for example, 450° C. to 550° C.

Therefore, the inventors have made a study of not performing the high-temperature regeneration by the post-injection when the filter in the particulate matter removing unit is clogged, but a low-temperature regeneration process that is executed at a lower temperature. An example of this low-temperature regeneration process includes a method in which an intake air quantity is throttled such that an air-fuel ratio of air and fuel is closer to a rich side to increase a temperature of the exhaust gas. On the other hand, the inventors have further made studies of a low-temperature regeneration process method in which an exhaust throttle valve is provided in a side of the exhaust pipe in the engine, wherein a load of the engine is increased by this exhaust throttle valve and as a result a temperature of the exhaust gas is increased, and further, a low-temperature regeneration process method in which an electronically controlled type fuel injection apparatus is used to switch an injection pattern of fuel, thus increasing a temperature of the exhaust gas.

On the other hand, in the construction machine that is represented by the hydraulic excavator, it becomes a mainstream to perform automatic idle control with the aim of saving and reduction of a fuel consumption quantity or reduction of noises. This automatic idle control in advance operates a selection switch in a case where a hydraulic actuator in a working machine continues to stop over a predetermined time. Therefore, a rotational speed of an engine is lowered to an automatic idle rotational speed (that is, rotational speed for non-load operation). However, the rotational speed of the engine is maintained to a low rotational speed while performing the automatic idle control. Therefore, a temperature of the exhaust gas is lowered, and in the particulate matter removing unit in the exhaust gas purifying apparatus, the filter tends to be easily clogged by deposit of the particulate matter.

In view of the aforementioned problems in the conventional art, it is an object of the present invention to provide a construction machine in which at the time of executing a regeneration process for an exhaust gas purifying apparatus in a state of performing automatic idle control, a temperature of the exhaust gas can easily be increased to a temperature necessary for regenerating the exhaust gas purifying apparatus by increasing a rotational speed of an engine to a regeneration processing rotational speed higher than an automatic idle rotational speed.

(1) In order to solve the aforementioned problems, the present invention is applied to a construction machine comprising an engine as a prime mover; an exhaust gas purifying apparatus that is provided in an exhaust side of the engine to purify an exhaust gas; a regeneration apparatus for executing a regeneration process to the exhaust gas purifying apparatus; a hydraulic pump that is driven by the engine to suck operating oil in a tank and discharge pressurized oil; at least one hydraulic actuator that is driven by the pressurized oil discharged from the hydraulic pump; a directional control valve that is provided between the hydraulic actuator and the hydraulic pump to control supply of the pressurized oil to the hydraulic actuator; a rotational speed instruction apparatus that instructs a rotational speed of the engine; an automatic idle selection unit configured to lower the rotational speed of the engine to a predetermined automatic idle rotational speed; and an engine control device that regularly controls the rotational speed of the engine according to an instruction value by the rotational speed instruction apparatus and, when the directional control valve is in a neutral position, controls the rotational speed of the engine to the automatic idle rotational speed by the automatic idle selection unit regardless of the instruction value.

The constitution adopted by the present invention is characterized in that the engine control device comprises a regeneration determining unit configured to determine whether or not the regeneration process to the exhaust gas purifying apparatus is executed by the regeneration apparatus, at the time of controlling the rotational speed of the engine to the automatic idle rotational speed by the automatic idle selection unit; and an engine rotational speed increasing unit configured to increase the rotational speed of the engine to a regeneration processing rotational speed higher than the automatic idle rotational speed, when it is determined that the regeneration process is executed by the regeneration determining unit.

With this arrangement, at a non-load operation of the engine (or at an operation where a load is small) in which all the hydraulic actuators stop, the rotational speed of the engine can be lowered to the automatic idle rotational speed to suppress wasteful consumption of fuel and achieve reduction of engine noises. In a case where the filter in the exhaust gas purifying apparatus is clogged by trapping, collecting and depositing the particulate matter at such automatic idle control, operating the regeneration apparatus enables a low-temperature regeneration process that increases a temperature of the exhaust gas. Moreover, since the rotational speed of the engine is increased to the regeneration processing rotational speed at this time, the processing operation of the regeneration apparatus can stably be performed thereby, and for example, the regeneration of the filter can smoothly be performed by burning off the particulate matter that is deposited in the filter in the particulate matter removing unit with the exhaust gas that has increased in temperature.

As a result, even when the temperature of the exhaust gas is lowered by a non-load operation or a light-load operation of the engine following the automatic idle control, the rotational speed of the engine is increased to the regeneration processing rotational speed, thus making it possible to easily increase the temperature of the exhaust gas to a temperature necessary for regenerating the exhaust gas purifying apparatus and execute the regeneration process to the exhaust gas purifying apparatus at a temperature as low as possible. As a result, the filter can be regenerated by burning off the particulate matter deposited in the filter of the particulate matter removing unit to stably execute the purifying process of the exhaust gas. Accordingly, reliability of the exhaust gas purifying apparatus can be improved.

(2) According to the present invention, when the rotational speed of the engine is increased to the regeneration processing rotational speed, a temperature of the exhaust gas is increased to a temperature necessary for the regeneration process of the exhaust gas purifying apparatus.

(3) According to the present invention, a temperature detector is provided in the exhaust gas purifying apparatus for detecting a temperature of the exhaust gas, and when the regeneration determining unit determines to execute the regeneration process, the engine rotational speed increasing unit in the engine control device increases the rotational speed of the engine until the temperature of the exhaust gas reaches a temperature for the regeneration process.

With this arrangement, at the time of executing the regeneration process of the exhaust gas purifying apparatus, the rotational speed of the engine is increased for each predetermined rotational speed until the temperature of the exhaust gas reaches the regeneration processing temperature. Therefore, the temperature of the exhaust gas can be increased to the temperature necessary for regenerating the exhaust gas purifying apparatus to execute the regeneration process to the exhaust gas purifying apparatus at the temperature as low as possible.

(4) The present invention comprises a rotational sensor for detecting the rotational speed of the engine, wherein the engine control device comprises a rotational speed determining unit configured to determine whether or not the rotational speed of the engine detected by the rotational sensor is a rotational speed equal to or more than the regeneration processing rotational speed; an idle rotational speed control unit configured to control the rotational speed of the engine to the automatic idle rotational speed, when the rotational speed determining unit determines that the rotational speed of the engine is a rotational speed lower than the regeneration processing rotational speed and the regeneration determining unit determines to execute the regeneration process; and an engine stopping unit configured to perform control of stopping the engine when a predetermined time elapses in a state where the rotational speed of the engine is controlled to the automatic idle rotational speed by the idle rotational speed control unit.

With this arrangement, when the rotational speed of the engine is the rotational speed lower than the regeneration processing rotational speed, the engine can be stopped after performing the automatic idle control over a predetermined time. As a result, it is possible to prevent the regeneration process to the exhaust gas purifying apparatus by the regeneration apparatus from continuing to be executed in a low-rotational speed state of the engine (that is, a state of a rotational speed lower than the regeneration processing rotational speed).

(5) According to the present invention, the regeneration apparatus executes a low-temperature regeneration process for increasing a temperature of the exhaust gas by a throttle valve that is provided in at least one of an intake side and an exhaust side of the engine.

With this arrangement, the regeneration apparatus that executes the regeneration process to the exhaust gas purifying apparatus can be constituted by the throttle valve provided in at least one of the intake side and the exhaust side of the engine. For example, when the filter in the exhaust gas purifying apparatus (particulate matter removing unit) is clogged, the throttle valve in the intake side, without performing the high-temperature regeneration by the post-injection, can execute the low-temperature regeneration process for increasing an exhaust gas temperature by throttling an intake air quantity in such a manner that an air-fuel ratio of air and fuel is closer to a rich side, for example. On the other hand, the throttle valve provided in the exhaust side of the engine can execute the low-temperature regeneration process for increasing the exhaust gas temperature as a result of increasing a load of the engine by throttling a flow of an exhaust gas.

MODE FOR CARRYING OUT THE INVENTION

Figure 1:
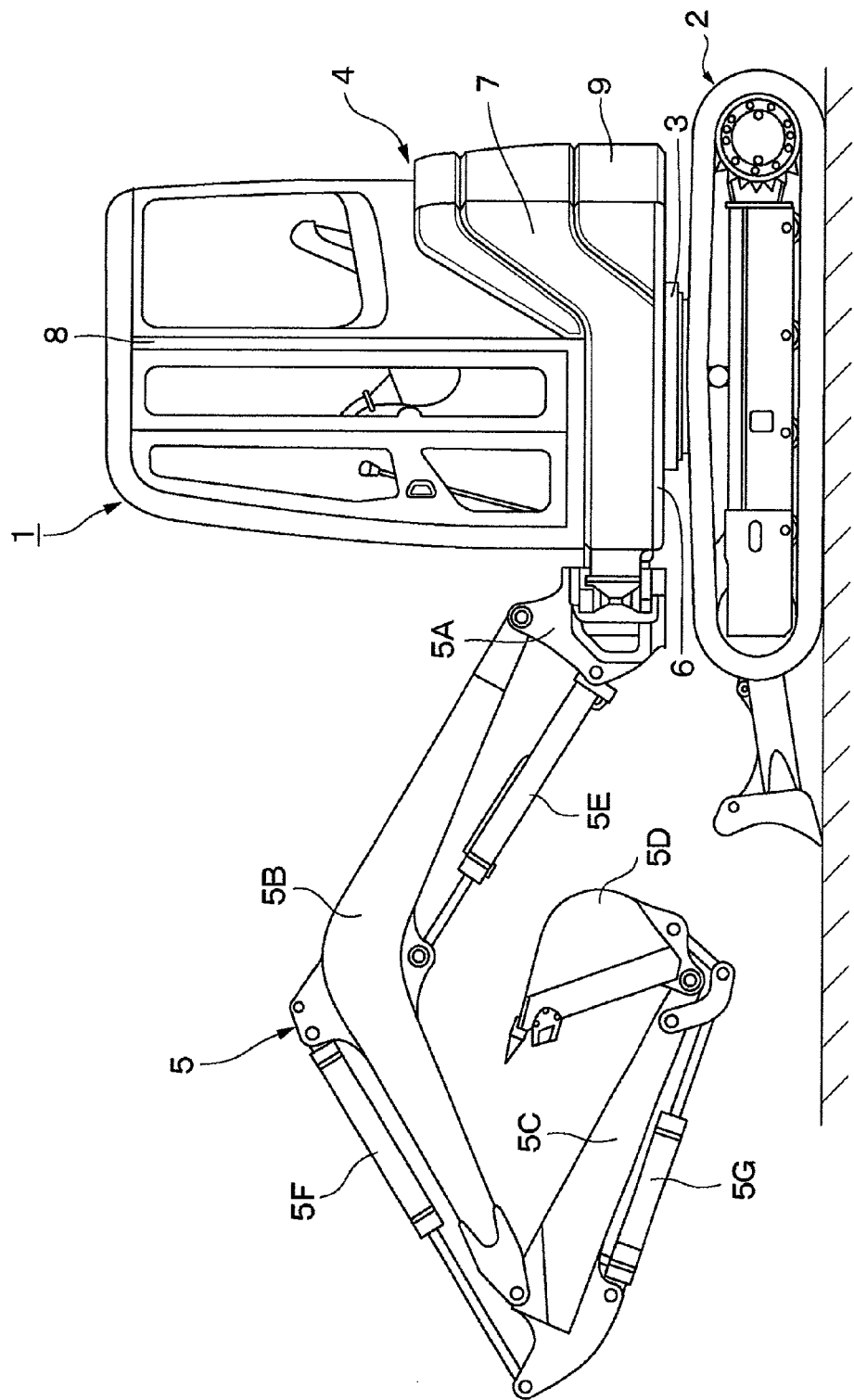
FIG. 1 is a front view showing a hydraulic excavator provided with an exhaust gas purifying apparatus according to a first embodiment in the present invention.

Hereinafter, a construction machine that is provided with an exhaust gas purifying apparatus according to an embodiment in the present invention will be in detail explained with reference to the accompanying drawings, by taking a case of being applied to a small-sized hydraulic excavator as an example.

Here, FIG. 1 to FIG. 6 show a hydraulic excavator provided with an exhaust gas purifying apparatus according to a first embodiment in the present invention.

In the figure, designated at 1 is a small-sized hydraulic excavator that is used for an excavating operation of earth and sand, and the like. The hydraulic excavator 1 is largely constituted by an automotive crawler type lower traveling structure 2, an upper revolving structure 4 that is mounted on the lower traveling structure 2 through a revolving device 3 to be capable of revolving thereon and constitutes a vehicle body together with the lower traveling structure 2, and a working mechanism 5 that is provided in a front side of the upper revolving structure 4 to be liftable and tiltable therein.

Here, the working mechanism 5 is constituted as a swing post type working mechanism, and for example, includes a swing post 5A, a boom 5B, an arm 5C, and a bucket 5D as a working tool, a swing cylinder (not shown), a boom cylinder 5E, an arm cylinder 5F and a bucket cylinder 5G. In addition, the upper revolving structure 4 is constituted by a revolving frame 6, an outer cover 7, a cab 8 and a counterweight 9, which will be described later, and the like.

The revolving frame 6 is a support structure of the upper revolving structure 4, and the revolving frame 6 is mounted on the lower traveling structure 2 through the revolving device 3. The revolving frame 6 is provided with the counterweight 9 and an engine 10 to be described later in a rear part side thereof, and the cab 8 to be described later in a left front side thereof. Further, in the revolving frame 6, the outer cover 7 is provided to be positioned between the cab 8 and the counterweight 9, and the engine 10, a hydraulic pump 13 and a heat exchanger 15 are accommodated in the outer cover 7.

The cab 8 is mounted in a left front side of the revolving frame 6, and the cab 8 defines therein a driver's room on which an operator boards. A driver's seat on which an operator is seated, and various kinds of operating levers (only an operating lever 27A to be described later is illustrated in FIG. 3) are arranged inside the cab 8.

Figure 2:
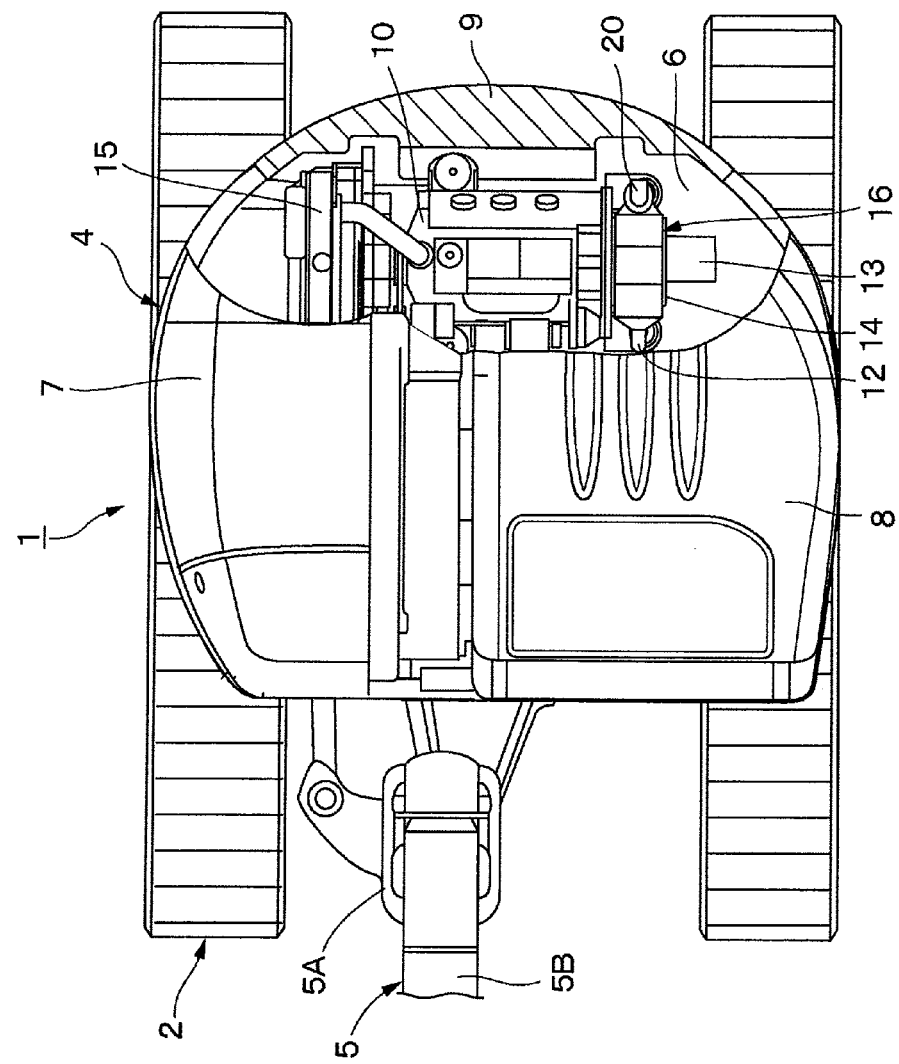
FIG. 2 is a partial cutout plan view showing in enlarged form the hydraulic excavator in a state where a part of a cab and an outer cover of an upper revolving structure in FIG. 1 is cut away.

The counterweight 9 constitutes a part of the upper revolving structure 4, and the counterweight 9 is positioned in a rear side of the engine 10 to be described later and is mounted in a rear end part of the revolving frame 6 to maintain a weight balance with the working mechanism 5. As shown in FIG. 2, a rear surface side of the counterweight 9 is formed in an arc shape, and is constituted to accommodate a revolving radius of the upper revolving structure 4 in a compact manner.

Indicated at 10 is the engine that is arranged in a laterally placed state in a rear side of the revolving frame 6, and the engine 10 is mounted as a prime mover on the small-sized hydraulic excavator as described above. Therefore, the engine 10 is constituted using, for example, a small-sized diesel engine. The engine 10 is provided with an intake pipe 11 and an exhaust pipe 12 forming a part of an exhaust gas passage, and an exhaust gas purifying apparatus 16, which will be described later, is connected to the exhaust pipe 12.

Figure 3:
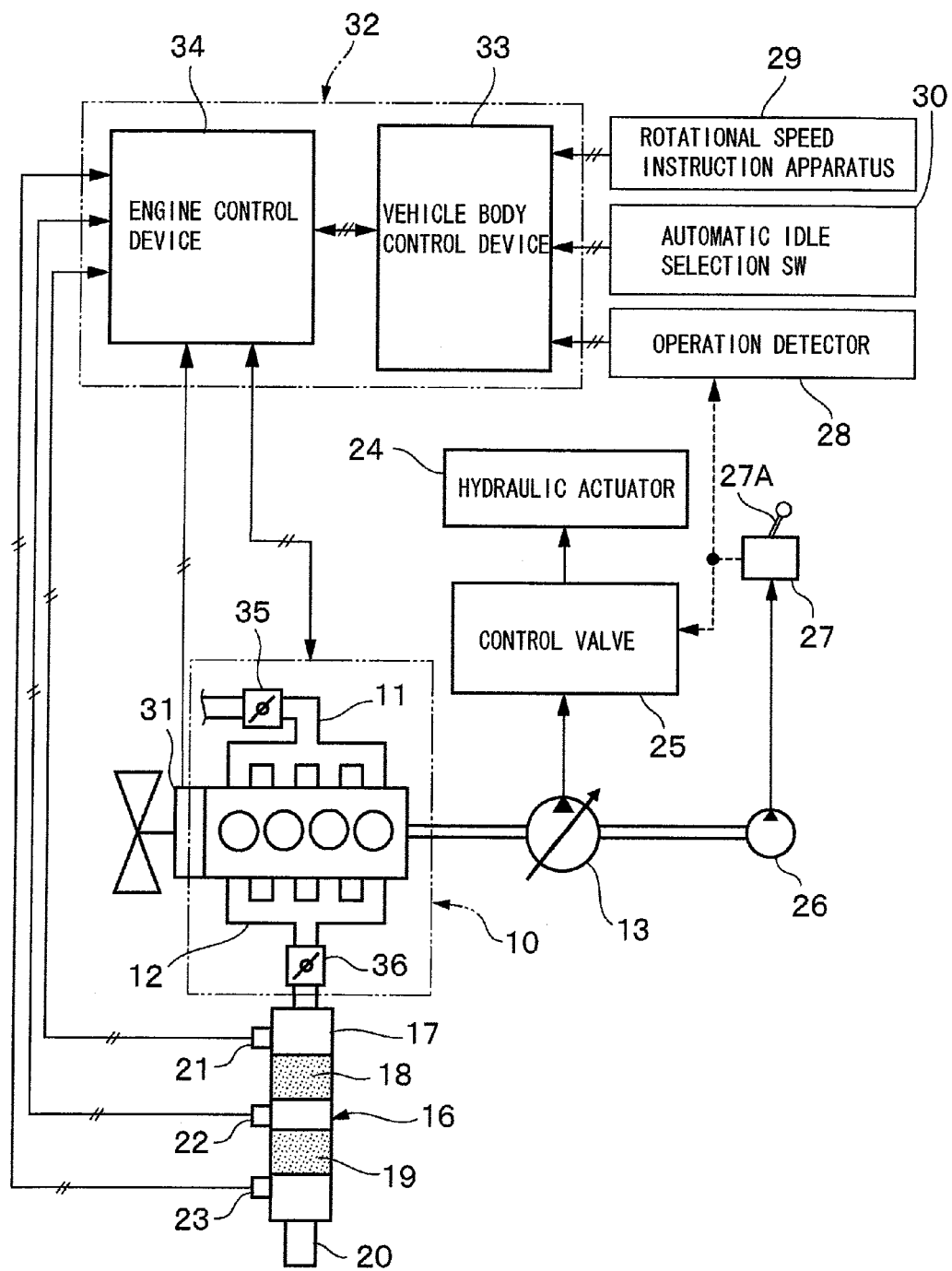
FIG. 3 is an entire constitution diagram showing an engine, a hydraulic pump, a control valve, a hydraulic actuator and an exhaust gas purifying apparatus.

That is, as shown in FIG. 3, the intake pipe 11 in the engine 10 is constituted by an intake manifold including a plurality of branch pipes, and the exhaust pipe 12 in the engine 10 is constituted by an exhaust manifold including a plurality of branch pipes. An intake throttle valve 35 to be described later is provided in the halfway of the intake pipe 11. On the other hand, an exhaust throttle valve 36 to be described later is provided in the halfway of the exhaust pipe 12.

Here, the engine 10 is constituted by an electronically controlled engine, wherein a supply quantity of fuel is variably controlled by an electronic governor (not shown). That is, the electronic governor variably controls an injection quantity of fuel supplied to the engine 10, based upon a control signal that is output from an engine control device 34 to be described later. Therefore, the rotational speed of the engine 10 is controlled in such a manner as to be equal to a rotational speed corresponding to a target rotational speed by the control signal.

The hydraulic pump 13 is mounted in a left side of the engine 10, and the hydraulic pump 13 constitutes a hydraulic source together with an operating oil tank (not shown). The hydraulic pump 13 is constituted by, for example, a swash plate type, bent axis type or radial piston type hydraulic pump of a variable displacement type or the like. It should be noted that the hydraulic pump 13 is not necessarily limited to the hydraulic pump of a variable displacement type, and may be constituted using a hydraulic pump of a fixed displacement type, for example.

As shown in FIG. 2, the hydraulic pump 13 is mounted in a left side of the engine 10 through a power transmission device 14, and the rotational output of the engine 10 is transmitted to the hydraulic pump 13 by the power transmission device 14. When the hydraulic pump 13 is driven by the engine 10, the hydraulic pump 13 sucks the operating oil in the operating oil tank and discharges the pressurized oil toward control valves 25 to be described later.

The heat exchanger 15 is provided on the revolving frame 6 to be positioned in a right side of the engine 10. The heat exchanger 15 is constituted by including, for example, a radiator, an oil cooler, and an intercooler. That is, the heat exchanger 15 cools the engine 10, and also cools the pressurized oil (operating oil) that is returned back to the operating oil tank, and the like.

Next, the exhaust gas purifying apparatus 16 that is used in the present embodiment will be explained.

That is, designated at 16 is the exhaust gas purifying apparatus that removes and purifies harmful substances contained in an exhaust gas in the engine 10, and the exhaust gas purifying apparatus 16 is, as shown in FIG. 2, arranged to be positioned in an upper part left side of the engine 10 and, for example, above the power transmission device 14. The exhaust gas purifying apparatus 16 is connected to the exhaust pipe 12 of the engine 10 at the upstream side. The exhaust gas purifying apparatus 16 constitutes an exhaust gas passage together with the exhaust pipe 12, and removes harmful substances contained in the exhaust gas while the exhaust gas flows from the upstream side to the downstream side thereof.

That is, the engine 10 made up of the diesel engine operates with a high efficiency and with excellent durability. However, harmful substances such as particulate matter (PM), nitrogen oxides (NOx), carbon monoxide (CO) are contained in the exhaust gas of the engine 10. Therefore, the exhaust gas purifying apparatus 16 that is mounted to the exhaust pipe 12 is constituted by including an oxidation catalyst 18, which will be described later, for oxidizing carbon monoxide (CO) and the like for removal, and a particulate matter removing filter 19, which will be described later, for trapping the particulate matter (PM) for removal.

As shown in FIG. 3, the exhaust gas purifying apparatus 16 has a cylindrical casing 17 constituted by connecting a plurality of cylindrical bodies removably in the front-rear side. The oxidation catalyst 18 (generally called a diesel oxidation catalyst, DOC in short) and the particulate matter removing filter 19 (generally called a diesel particulate filter, DPF in short) are removably accommodated in the casing 17.

The oxidation catalyst 18 is formed of a cell-shaped cylindrical body made of ceramic having an outer diameter dimension that is equivalent to an inner diameter dimension of the casing 17, for example, wherein many through bores (not shown) are axially formed, and the inner surface is coated with precious metals. The oxidation catalyst 18 forces an exhaust gas to flow in each of the through bores at a predetermined temperature to oxidize carbon monoxide (CO) and hydrocarbon (HC) contained in the exhaust gas for removal and remove nitrogen oxides (NO) as nitrogen dioxides (NO2).

Further, the particulate matter removing filter 19 is arranged downstream of the oxidation catalyst 18 in the casing 17. The particulate matter removing filter 19 traps particulate matter (PM) in the exhaust gas discharged from the engine 10 and burns the trapped particulate matter for removal to perform purification of the exhaust gas. Therefore, the particulate matter removing filter 19 is constituted by a cell-shaped cylindrical body in which many small bores (not shown) are axially provided in a porous member made of a ceramic material, for example. Therefore, the particulate matter removing filter 19 traps the particulate matter through many small bores, and the trapped particulate matter burns for removal as described above. As a result, the particulate matter removing filter 19 is regenerated.

As shown in FIG. 3, a discharge port 20 of an exhaust gas is provided in the downstream side of the exhaust gas purifying apparatus 16. The discharge port 20 is positioned downstream of the particulate matter removing filter 19 and is connected to an outlet side of the casing 17. The discharge port 20 is constituted by including a chimney for releasing the exhaust gas after being subject to the purification process to an atmosphere, for example.

An exhaust gas temperature sensor 21 detects a temperature t of an exhaust gas, and the exhaust gas temperature sensor 21 constitutes a temperature detector according to the present invention. As shown in FIG. 3, the exhaust gas temperature sensor 21 is mounted on the casing 17 of the exhaust gas purifying apparatus 16, and detects a temperature t of the exhaust gas discharged from the exhaust pipe 12. The temperature t detected by the exhaust gas temperature sensor 21 is output to the engine control device 34 to be described later as a detection signal.

Gas pressure sensors 22 and 23 are provided to the casing 17 of the exhaust gas purifying apparatus 16, and the gas pressure sensors 22 and 23 are arranged to be separated from each other to put the particulate matter removing filter 19 therebetween. One gas pressure sensor 22 detects a gas pressure of an exhaust gas at the upstream side (inlet side) of the particulate matter removing filter 19 as a pressure P1, and the other gas pressure sensor 23 detects a gas pressure of an exhaust gas at the downstream side (outlet side) of the particulate matter removing filter 19 as a pressure P2. Each of the gas pressure sensors 22 and 23 outputs a detection signal to the engine control device 34 to be described later.

The engine control device 34, based upon the upstream pressure P1 detected by the gas pressure sensor 22 and the downstream pressure P2 detected by the gas pressure sensor 23, calculates a pressure difference ΔP therebetween according to the following formula 1. Further, the engine control device 34 estimates a deposit amount, that is, a trapping amount of particulate matter and unburned residues attached to the particulate matter removing filter 19 from the calculation result of the pressure difference ΔP. In this case, the pressure difference ΔP becomes a small pressure value when the trapping amount is small, and becomes a higher pressure value as the trapping amount increases.

$$\Delta P = P1 - P2 \qquad \text{[Formula 1]}$$

A plurality of hydraulic actuators 24 (only one is illustrated in FIG. 3) are driven by pressurized oil that is discharged from the hydraulic pump 13. These hydraulic actuators 24 are constituted by including, for example, the swing cylinder (not shown), the boom cylinder 5E, and the arm cylinder 5F or the bucket cylinder 5G of the working mechanism 5 (refer to FIG. 1). The hydraulic actuators 24 that are mounted on the hydraulic excavator 1 include, for example, a hydraulic motor for traveling, a hydraulic motor for revolving and a lifting cylinder for earth removal plate (any thereof is not illustrated).

A plurality of control valves 25 (only one is illustrated in FIG. 3) form directional control valves for the hydraulic actuators 24. Each of the control valves 25 is provided between the hydraulic pump 13 and each of the hydraulic actuators 24, and variably controls a flow amount and a direction of the pressurized oil that is supplied to each of the hydraulic actuators 24. That is, each of the control valves 25 is switched from a neutral position to a right or left switching position (any thereof is not illustrated) by supply of a pilot pressure from an operating valve 27 to be described later.

A pilot pump 26 is an auxiliary hydraulic pump constituting an auxiliary hydraulic source together with the operating oil tank. As shown in FIG. 3, the pilot pump 26 is driven and rotated by the engine 10 together with the main hydraulic pump 13. The pilot pump 26 discharges operating oil that is sucked from the inside of the operating oil tank toward the operating valve 27 to be described later.

The operating valve 27 is constituted by a pilot operating valve of a pressure reducing valve type. The operating valve 27 is provided in the cab 8 (refer to FIG. 1) of the hydraulic excavator 1, and has an operating lever 27A rotated in such a manner as to be tilted by an operator. Each of the operating valves 27 is arranged to correspond in number to the plurality of the control valves 25 for individually performing remote control of the plurality of the hydraulic actuators 24. That is, at the time the operator rotates and tilts the operating lever 27A, each of the operating valves 27 supplies the pilot pressure in accordance with the operating quantity to a hydraulic pilot portion (not shown) of each of the control valves 25.

Thereby the control valve 25 is switched from the neutral position to any of the switching positions. When the control valve 25 is switched to one of the switching positions, the pressurized oil from the hydraulic pump 13 is supplied to the hydraulic actuator 24 in one direction, which is driven in the corresponding direction. On the other hand, when the control valve 25 is switched to the other of the switching positions, the pressurized oil from the hydraulic pump 13 is supplied to the hydraulic actuator 24 in the other direction, which is driven in the reverse direction.

As shown in FIG. 3, an operation detector 28 detects whether or not the control valve 25 is in a neutral position. The operation detector 28 is constituted by a pressure sensor for detecting a pilot pressure that is output from the operating valve 27. That is, the operation detector 28 detects whether or not the control valve 25 is in the neutral position depending on whether the pilot pressure is higher or lower than a predetermined pressure value.

The rotational speed instruction apparatus 29 instructs a target rotational speed of the engine 10. The rotational speed instruction apparatus 29 is provided in the cab 8 (refer to FIG. 1) of the hydraulic excavator 1, and is constituted by an operating dial, an up and down switch, an engine lever or the like (any thereof is not shown), which is operated by an operator. The rotational speed instruction apparatus 29 outputs an instruction signal of the target rotational speed according to an operation of the operator to a vehicle body control device 33 to be described later.

An automatic idle selection switch 30 is provided in the cab 8 of the hydraulic excavator 1, and is operated to open/close by an operator. This automatic idle selection switch 30 constitutes an automatic idle selection unit according to the present invention. The automatic idle selection switch 30 outputs an opening signal at the time of opening a switch or a closing signal at the time of closing the switch to the vehicle body control device 33 to be described later. That is, the vehicle body control device 33 cooperates with the engine control device 34 to be described later to perform the automatic idle control for lowering an engine rotational speed N to a predetermined automatic idle rotational speed Nai at the time the automatic idle selection switch 30 is closed, and on the other hand, control the engine rotational speed N according to the target rotational speed instructed by the rotational speed instruction apparatus 29 without performing the automatic idle control at the time the automatic idle selection switch 30 is opened.

A rotational sensor 31 detects a rotational speed N of the engine 10, and the rotational sensor 31 outputs a detection signal of the rotational speed N to the engine control device 34. The engine control device 34 monitors an actual rotational speed of the engine 10 based upon the detection signal of the engine rotational speed N, and controls the engine rotational speed N according to the target rotational speed instructed by the rotational speed instruction apparatus 29, for example.

Designated at 32 is a control device of the hydraulic excavator 1, and the control device 32 is, as shown in FIG. 3, constituted by including the vehicle body control device 33 and the engine control device 34. The vehicle body control device 33 performs control necessary for traveling the hydraulic excavator 1, for example, variably controls a discharge displacement of the hydraulic pump 13 according to signals that are output from the operation detector 28, the rotational speed instruction apparatus 29 and the automatic idle selection switch 30. Further, the vehicle body control device 33 also has a function of outputting an instruction signal that instructs the target rotational speed of the engine 10 to the engine control device 34 according to signals that are output from the operation detector 28, the rotational speed instruction apparatus 29 and the automatic idle selection switch 30.

The engine control device 34 executes a predetermined calculation process based upon the instruction signal that is output from the vehicle body control device 33, a detection signal of the engine rotational speed N that is output from the rotational sensor 31, and the like, and outputs a control signal for instructing a target fuel injection quantity to the electronic governor of the engine 10. The electronic governor of the engine 10 increases or decreases an injection quantity of fuel or stops injection of fuel that is injected and supplied into a combustion chamber (not shown) of the engine 10 according to the control signal. As a result, the rotational speed of the engine 10 is controlled in such a manner as to be equal to a rotational speed corresponding to a target rotational speed instructed by the instruction signal from the vehicle body control device 33.

That is, the engine control device 34 controls the rotational speed of the engine 10 according to an instruction value (target rotational speed) by the rotational speed instruction apparatus 29 at the time the automatic idle selection switch 30 is opened. However, when the automatic idle selection switch 30 is closed and all of the control valves 25 are in a neutral position by the operation detector 28, the engine control device 34 has a function of controlling the rotational speed of the engine 10 to the automatic idle rotational speed Nai regardless of the instruction value.

The engine control device 34 has an input side that is connected to the exhaust gas temperature sensor 21, the gas pressure sensors 22 and 23, the rotational sensor 31 and the vehicle body control device 33, and an output side that is connected to the electronic governor of the engine 10, and the intake throttle valve 35, the exhaust throttle valve 36 and the vehicle body control device 33, which will be described later. On the other hand, the engine control device 34 has a memory component (not shown) composed of a ROM, a RAM, an involatile memory, and the like. A processing program for controlling the engine rotational speed N shown in FIG. 6 to be described later, a determination time T1 for automatic idling that is in advance determined, the automatic idle rotational speed Nai and the regeneration processing rotational speed N1 of the engine 10, and the like are stored in the memory component.

Here, the engine control device 34, based upon the upstream pressure P1 detected by the gas pressure sensor 22 and the downstream pressure P2 detected by the gas pressure sensor 23, calculates a pressure difference ΔP therebetween according to the aforementioned formula 1. Besides, the engine control device 34 estimates a trapping amount and a deposit amount of the particulate matter and unburned residues attached to the particulate matter removing filter 19 (refer to FIG. 3) from the pressure difference ΔP therebetween. When the pressure difference ΔP exceeds a reference pressure value ΔP0 that is in advance determined, it is determined that the deposit amount becomes large, and therefore the regeneration process of the particulate matter removing filter 19 becomes necessary. It should be noted that an example of the method of estimating the deposit amount of the particulate matter includes a method of estimating it from an operating condition (for example, a rotational speed, an injection quantity, and the like) of the engine, in addition to the estimation method by the aforementioned pressure difference ΔP.

Indicated at 35 is the intake throttle valve that is provided in a side of the intake pipe 11 of the engine 10, and the intake throttle valve 35 constitutes the regeneration apparatus for executing the regeneration process of the particulate matter removing filter 19 in the exhaust gas purifying apparatus 16 shown in FIG. 3. That is, the intake throttle valve 35 is held to be in an opening state (for example, an opening degree corresponding to a fuel injection quantity or in a fully opening state) at a regular operation by a control signal from the engine control device 34. However, at the time of executing the regeneration process to the particulate matter removing filter 19, the intake throttle valve 35 is driven in a closing direction by the control signal from the engine control device 34.

Thereby, the intake throttle valve 35 throttles an intake air quantity in such a manner that an air-fuel ratio of air and fuel is in a rich side, for example. Therefore, the fuel in which the air-fuel ratio is in a rich side burns in the combustion chamber of the engine 10, and thereby a temperature t of an exhaust gas that is discharged to a side of the exhaust pipe 12 increases to 250° C. or thereabouts, for example. As a result, the low-temperature regeneration process is executed by thermal energy due to the exhaust gas at this time, in the particulate matter removing filter 19 in the exhaust gas purifying apparatus 16.

Indicated at 36 is the exhaust throttle valve that is provided in a side of the exhaust pipe 12 of the engine 10, and the exhaust throttle valve 36 constitutes the regeneration apparatus for executing the regeneration process of the particulate matter removing filter 19 in the exhaust gas purifying apparatus 16 shown in FIG. 3. That is, the exhaust throttle valve 36 is held to be in a fully opening state at a regular operation by a control signal from the engine control device 34. However, at the time of executing the regeneration process of the particulate matter removing filter 19, the exhaust throttle valve 36 is driven in a closing direction by the control signal from the engine control device 34 to perform control by which an opening degree thereof is throttled to be small.

As a result, the exhaust throttle valve 36 throttles a flow amount of the exhaust gas flowing in the exhaust pipe 12 to provide the back pressure to the engine 10 and increase a load of the engine 10. Therefore, the engine control device 34 increases a fuel injection quantity by the electronic governor of the engine 10 corresponding to the above-mentioned load. As a result, the temperature of the exhaust gas increases to 250° C. or thereabouts, for example, and the low-temperature regeneration process is executed in the particulate matter removing filter 19 in the exhaust gas purifying apparatus 16.

Figure 4:
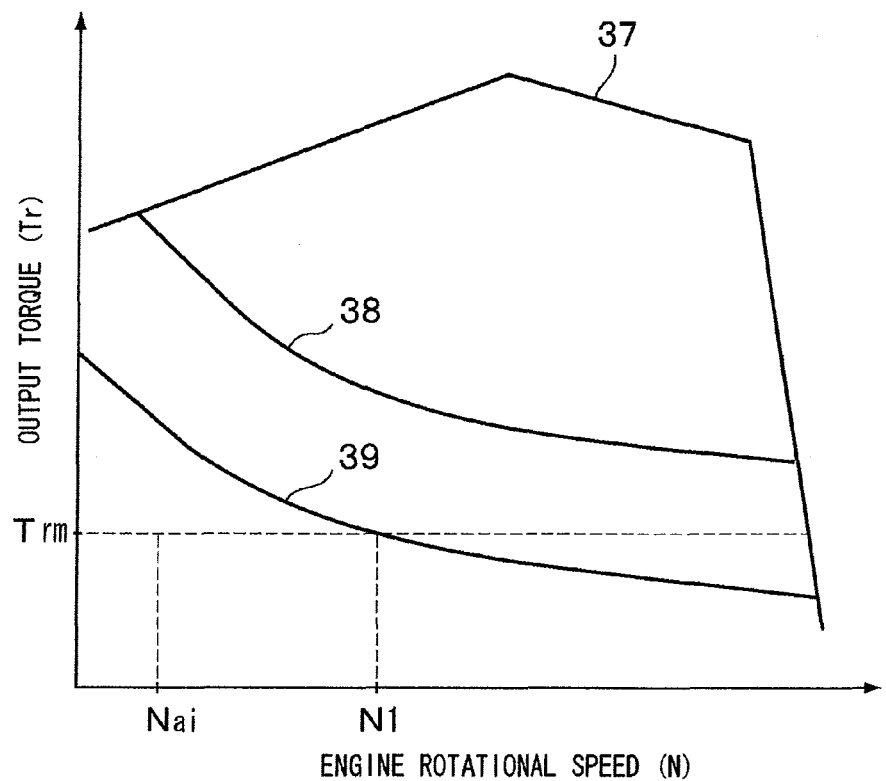
FIG. 4 is a characteristics line diagram showing a relation between an engine rotational speed and output torque, and a temperature of an exhaust gas.

Here, output torque Tr of the engine 10 has torque characteristics as a characteristics line 37 shown in FIG. 4 to the engine rotational speed N. In a state of stopping the regeneration apparatus (that is, a state of a regular operation where the low-temperature regeneration process by the intake throttle valve 35 and the exhaust throttle valve 36 is not executed), for example, when the exhaust gas temperature is 250° C., an iso-exhaust gas temperature line is expressed as a characteristics line 38. Specifically, the iso-exhaust gas temperature line in a regular operation where the exhaust gas temperature of the engine 10 is, for example, 250° C. rises as the characteristics line 38 in a state of maintaining the exhaust gas temperature of the engine 10 to be 250° C. when the output torque Tr becomes large even in a state where the engine rotational speed N is a low rotational speed. In addition, when the engine rotational speed N increases from a low rotational speed to a high rotational speed, even if the output torque Tr decreases along the characteristics line 38, the exhaust gas temperature is kept to be 250° C.

On the other hand, in a state where the regeneration apparatus is activated (that is, a state at a regeneration time where the low-temperature regeneration process by the intake throttle valve 35 and the exhaust throttle valve 36 is executed), the iso-exhaust gas temperature line when the exhaust gas temperature is 250° C., is lowered from a position of the characteristics line 38 to a position of a characteristics line 39. Therefore, at the time of performing the low-temperature regeneration of the particulate matter removing filter 19, as shown in the characteristics line 39, the engine rotational speed N is set to a rotational speed higher than the automatic idle rotational speed Nai, that is, the regeneration processing rotational speed N1 (N1>Nai). Therefore, the exhaust gas temperature of the engine 10 can be increased to a low-temperature regeneration temperature t1 (for example, t1 is approximately equal to 250° C.).

In this case, the low-temperature regeneration temperature t1 is a temperature as a determination reference for determining whether or not a temperature t of an exhaust gas discharged from the engine 10 is increased to a temperature where the regeneration process of the particulate matter removing filter 19 is executable (that is, a temperature where the particulate matter contained in the exhaust gas is combustible). Further, a torque value Trm shown in FIG. 4 is drag torque that the engine 10 receives from the hydraulic pump 13.

Figure 5:
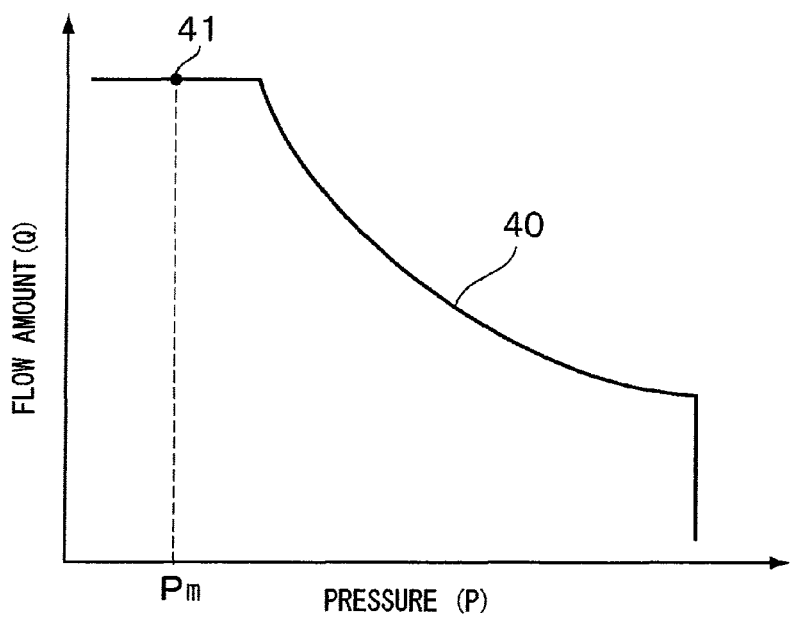
FIG. 5 is a characteristics line diagram showing a relation between a delivery pressure and a flow amount of the hydraulic pump.

That is, the hydraulic pump 13 is driven in a range of a characteristics line 40 defined by a delivery pressure (P) and a delivery flow amount (Q) shown in FIG. 5. For example, also in a state where all of the hydraulic actuators 24 are stopped and all of the control valves 25 are maintained to be in a neutral position (light load state close to a non-load operation), which is shown in FIG. 3, a pressure Pm at a light load due to a pipe (line) resistance is generated in the hydraulic circuit.

Therefore, also when the engine 10 rotates at an automatic idle rotational speed Nai by the automatic idle control, the hydraulic pump 13 is driven to rotate by the engine 10 in a position of an operating point 41 at a drag operation shown in FIG. 5. At this time, the drag torque that the engine 10 receives from the hydraulic pump 13 is the torque value Trm shown in FIG. 4. In other words, when the engine 10 drives and rotates the hydraulic pump 13 in the position of the operating point 41 at the drag operation, the engine 10 generates the output torque Tr as the torque value Trm shown in FIG. 4.

The exhaust gas purifying apparatus 16 that is mounted on the hydraulic excavator 1 according to the present embodiment has the constitution as described above, and next, an operation of the exhaust gas purifying apparatus 16 will be explained.

An operator of the hydraulic excavator 1 boards on the cab 8 of the upper revolving structure 4, and starts the engine 10 to drive the hydraulic pump 13 and the pilot pump 26. Thereby, the pressurized oil is discharged from the hydraulic pump 13, and the pressurized oil is supplied to the hydraulic actuator 24 via the control valve 25. In addition, the pressurized oil is supplied to other actuators (for example, a hydraulic motor for traveling or revolving or the other hydraulic cylinder) from control valves (not shown) other than this one. When the operator who boards on the cab 8 operates the operating lever for traveling (not shown), it enables the lower traveling structure 2 to move forward or backward.

On the other hand, the operator in the cab 8 operates the operating lever for work, for example, the operating lever 27A of the operating valve 27 shown in FIG. 3, the working mechanism 5 is lifted and tilted, thus making it possible to perform an excavating operation of earth and sand. The small-sized hydraulic excavator 1, since a revolving radius of the upper revolving structure 4 is small, can perform a ditch excavating operation by the working mechanism 5 while revolving the upper revolving structure 4 even in a narrow working site such as an urban area, for example. In this case, there are some cases where a reduction in noise is achieved by driving the engine 10 in a light load state.

At an operation of the engine 10, the particulate matter that is the harmful substance is discharged from the exhaust pipe 12. At this time, the exhaust gas purifying apparatus 16 can oxidize and remove hydrocarbon (HC), nitrogen oxides (NO), carbon monoxide (CO) in the exhaust gas by the oxidation catalyst 18, for example. The particulate matter removing filter 19 traps particulate matter contained in the exhaust gas, and burns the trapped particulate matter for removal (regeneration). As a result, the purified exhaust gas can be discharged from the downstream discharge port 20 to an outside.

Incidentally, in the hydraulic excavator 1 of a small revolving type (small size) having the small-sized, compact stricture, it becomes a mainstream to perform the automatic idle control with the aim of saving and reduction in fuel consumption quantity or reduction in noise. However, at the time of performing the automatic idle control, the rotational speed of the engine 10 is maintained to the automatic idle rotational speed Nai as a low rotational speed. Therefore, the temperature t of the exhaust gas is lowered to a temperature lower than a low-temperature regeneration temperature t1 (for example, t1 is approximately equal to 250° C.). Therefore, the particulate matter is trapped and deposited in the particulate matter removing filter 19 in the exhaust gas purifying apparatus 16, and the filter 19 tends to be easily clogged.

Figure 6:
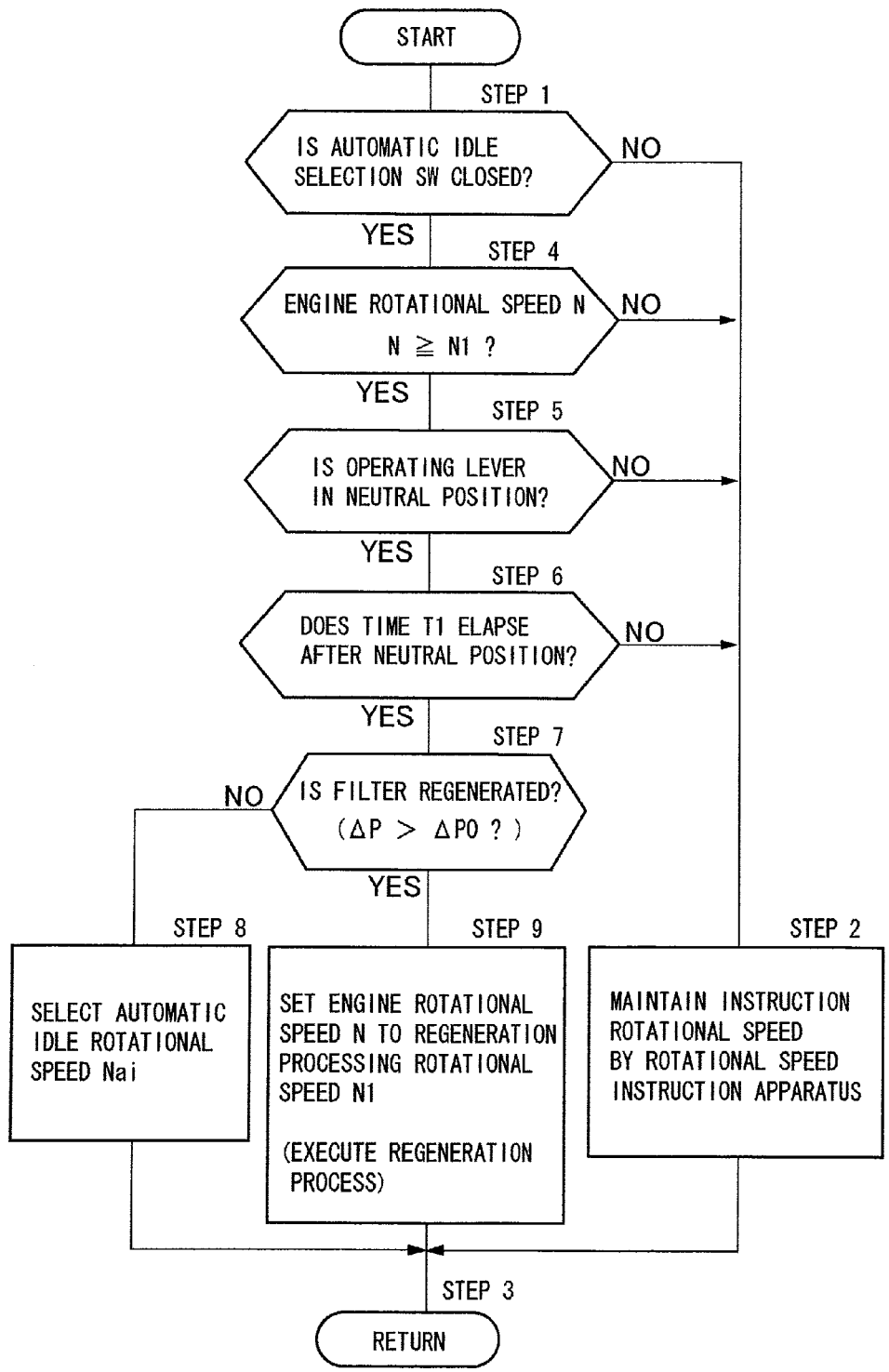
FIG. 6 is a flow chart showing automatic idle control and a filter regeneration process of the exhaust gas purifying apparatus.

Therefore, according to the first embodiment, the engine control device 34 is constituted to execute the automatic idle control and the filter regeneration process of the exhaust gas purifying apparatus 16 along the program shown in FIG. 6. That is, at the time of executing the regeneration process of the exhaust gas purifying apparatus 16 (particulate matter removing filter 19) in a state where the automatic idle control is effective, the engine rotational speed N is increased to the regeneration processing rotational speed N1 higher than the automatic idle rotational speed Nai. Thereby, the temperature t of the exhaust gas is easily increased to a temperature (low-temperature regeneration temperature t1) necessary for regenerating the exhaust gas purifying apparatus 16, and the regeneration process of the exhaust gas purifying apparatus 16 can be executed at a temperature as low as possible.

That is, when the processing operation of FIG. 6 starts with a drive of the engine 10, at step 1 it is determined whether or not the automatic idle selection switch 30 is closed. While the determination of "NO" is made at step 1, since the automatic idle selection switch 30 is opened, the automatic idle control is not performed. Therefore, at next step 2 the rotational speed of the engine 10 is controlled according to a target rotational speed (instruction rotational speed) instructed by the rotational speed instruction apparatus 29 by an operator in the cab 8, and the engine rotational speed N is maintained to the instruction rotational speed. After that, at step 3 the process returns.

When the determination of "YES" is made at step 1, since the automatic idle control is selected, at next step 4 it is determined whether or not an actual rotational speed (engine rotational speed N) detected by the rotational sensor 31 attached to the engine 10 is a rotational speed equal to or more than the regeneration processing rotational speed N1. When the determination of "NO" is made at step 4, the engine rotational speed N is lowered to the rotational speed lower than the regeneration processing rotational speed N1. When the engine rotational speed N is lowered to the rotational speed lower than the regeneration processing rotational speed N1, the particulate matter removing filter 19 in the exhaust gas purifying apparatus 16 cannot appropriately execute the regeneration process, and as a result, the deposit amount of the particulate matter and the unburned residues increases. Therefore, for preventing this problem, the process transfers to step 2, wherein the engine rotational speed N is maintained to the instruction rotational speed, and at step 3 the process returns.

When the determination of "YES" is made at step 4, since the engine rotational speed N is equal to or more than the regeneration processing rotational speed N1, at next step 5 it is determined whether or not the operating lever 27A is in a neutral position. While the determination of "NO" is made at step 5, at least one control valve 25 of the plurality of the control valves 25 is switched from the neutral position to a switching position, and any of the hydraulic actuators 24 is driven. Therefore, the process transfers to step 2, wherein the engine rotational speed N is maintained to the instruction rotational speed, and at step 3 the process returns.

When the determination of "YES" is made at step 5, all of the hydraulic actuators 24 mounted on the hydraulic excavator 1 stop, and all of the control valves 25 are maintained in the neutral position. That is, the engine 10 is in a light load state close to a non-load operation, and the output torque Tr of the engine 10 is lowered to the drag torque (torque value Trm shown in FIG. 4) from the hydraulic pump 13.

Therefore, at next step 6 after the operating lever 27A is returned back to the neutral position, it is determined whether or not the determination time T1 for automatic idle that is in advance determined elapses. While the determination of "NO" is made at step 6, since the determination time T1 for automatic idle is not met, the process transfers to step 2, where the engine rotational speed N is maintained to the instruction rotational speed, and at step 3 the process returns. That is, when the automatic idle control is frequently interrupted after being started, it causes the load and the fuel consumption performance of the engine 10 to be lowered. Therefore, the determination process at step 6 is the process for suppressing start of the automatic idle control until the determination time T1 for automatic idle elapses.

When the determination of "YES" is made at step 6, since the determination time T1 for automatic idle elapses, the process transfers to step 7, where it is determined whether or not the regeneration process of the filter is executed. That is, at step 7 it is determined whether or not the low-temperature regeneration process is executed to the particulate matter removing filter 19 in the exhaust gas purifying apparatus 16 by using the regeneration apparatus (for example, the intake throttle valve 35 and the exhaust throttle valve 36).

In other words, it is determined whether or not a pressure difference $\Delta P$ (refer to the aforementioned formula 1) by the gas pressure sensors 22 and 23 shown in FIG. 3 is larger than a predetermined reference pressure value $\Delta P0$. When the pressure difference $\Delta P$ at this time is smaller than the reference pressure value $\Delta P0$, it can be determined that the deposit amount of the particulate matter and the unburned residues attached to the particulate matter removing filter 19 in the exhaust gas purifying apparatus 16 does not increase to the amount in which the regeneration process is necessary. On the other hand, when the pressure difference $\Delta P$ is larger than the reference pressure value $\Delta P0$, it can be determined that the deposit amount of the particulate matter and the unburned residues attached to the particulate matter removing filter 19 in the exhaust gas purifying apparatus 16 increases to the amount in which the regeneration process is necessary.

When the determination of "NO" is made at step 7, it is a case where it is not necessary to execute the low-temperature regeneration process to the particulate matter removing filter 19 in the exhaust gas purifying apparatus 16. Therefore, at step 8 the automatic idle rotational speed Nai is selected as the target rotational speed of the engine 10 for performing the automatic idle control to perform control of lowering the engine rotational speed N to the automatic idle rotational speed Nai.

When the determination of "YES" is made at step 7, there occurs the necessity of executing the low-temperature regeneration process to the particulate matter removing filter 19 in the exhaust gas purifying apparatus 16. Therefore, at step 9 the target rotational speed of the engine 10 is set to the regeneration processing rotational speed N1, and the control of increasing the engine rotational speed N from the automatic idle rotational speed Nai to the regeneration processing rotational speed N1 is performed. That is, the engine control device 34 executes the low-temperature regeneration process using the intake throttle valve 35 and/or the exhaust throttle valve 36.

As a result of the process at step 9, the engine control device 34 outputs a control signal to the engine 10 for executing the low-temperature regeneration process. Therefore, the intake throttle valve 35 that is provided in the intake pipe 11 of the engine 10 performs control of reducing an intake air quantity to make an air-fuel ratio be in a rich side. In addition, the exhaust throttle valve 36 that is provided in a side of the exhaust pipe 12 performs control of throttling a flow amount of the exhaust gas to provide a load to the engine 10. This low-temperature regeneration process may be executed by using both the intake throttle valve 35 and the exhaust throttle valve 36 or by using only one thereof depending on a case.

In a state of a regular operation where the low-temperature regeneration process is not executed, the iso-exhaust gas temperature line at 250° C. is expressed as the characteristics line 38 in FIG. 4. However, by executing the low-temperature regeneration process as described above, the iso-exhaust gas temperature line at 250° C. is reduced to a position of the characteristics line 39 shown in FIG. 4. In addition, at the time of performing the automatic idle control of the engine 10, the output torque Tr of the engine 10 is lowered to the drag torque (the torque value Trm shown in FIG. 4) from the hydraulic pump 13.

Therefore, at the time of executing the low-temperature regeneration of the particulate matter removing filter 19, the target rotational speed of the engine 10 is set to the regeneration processing rotational speed N1 (N1>Nai) expressed in a crossing point between the torque value Trm and the characteristics line 39 to control the engine rotational speed N. Therefore, the exhaust gas temperature of the engine 10 can be increased to the low-temperature regeneration temperature t1 (for example, t1 is approximately 250° C.).

In this way, according to the first embodiment, the engine control device 34 lowers the engine rotational speed N to the automatic idle rotational speed Nai at a non-load operation (or in a small-load operation) of the engine 10 where all of the hydraulic actuators 24 are stopped, and therefore wasteful consumption of fuel can be suppressed, and a reduction in noises of the engine 10 can be achieved. In addition, the engine control device 34 can easily execute the regeneration process to the exhaust gas purifying apparatus 16 at a temperature as low as possible also in the halfway of the automatic idle control.

That is, in a case where the particulate matter removing filter 19 in the exhaust gas purifying apparatus 16 is clogged by trapping, collecting, and depositing the particulate matter in the halfway of the automatic idle control, the engine control device 34 operates the regeneration apparatus (the intake throttle valve 35 and the exhaust throttle valve 36). Thereby the low-temperature regeneration process can be executed as shown in the characteristics line 39 of FIG. 4. Further, the engine control device 34 only sets the engine rotational speed N to the regeneration processing rotational speed N1 at this time to be able to increase the exhaust gas temperature of the engine 10 to the low-temperature regeneration temperature t1 (for example, t1 is approximately 250° C.).

In this way, the engine control device 34 executes the low-temperature regeneration process of increasing the temperature t of the exhaust gas to the low-temperature regeneration temperature t1 to be able to burn off the particulate matter that is deposited in the particulate matter removing filter 19 by the temperature-increased exhaust gas and smoothly perform the regeneration of the filter 19. That is, the engine control device 34 increases the engine rotational speed N to the regeneration processing rotational speed N1 higher than the automatic idle rotational speed Nai to easily increase the temperature t of the exhaust gas to a temperature (low-temperature regeneration temperature t1) necessary for regenerating the exhaust gas purifying apparatus 16, thus making it possible to execute the regeneration process to the exhaust gas purifying apparatus 16 at a temperature as low as possible.

Accordingly, the engine control device 34 that is adopted in the first embodiment can increase the rotational speed N of the engine 10 to the regeneration processing rotational speed N1 even when the temperature t of the exhaust gas is lowered by a non-load operation or a light-load operation of the engine 10 following the automatic idle control. Thereby, the temperature t of the exhaust gas can be increased to the temperature necessary for regenerating the exhaust gas purifying apparatus 16. As a result, the engine control device 34 can regenerate the filter by burning off the particulate matter deposited in the particulate matter removing filter 19 to stably execute the purifying process of the exhaust gas.

Figure 7:
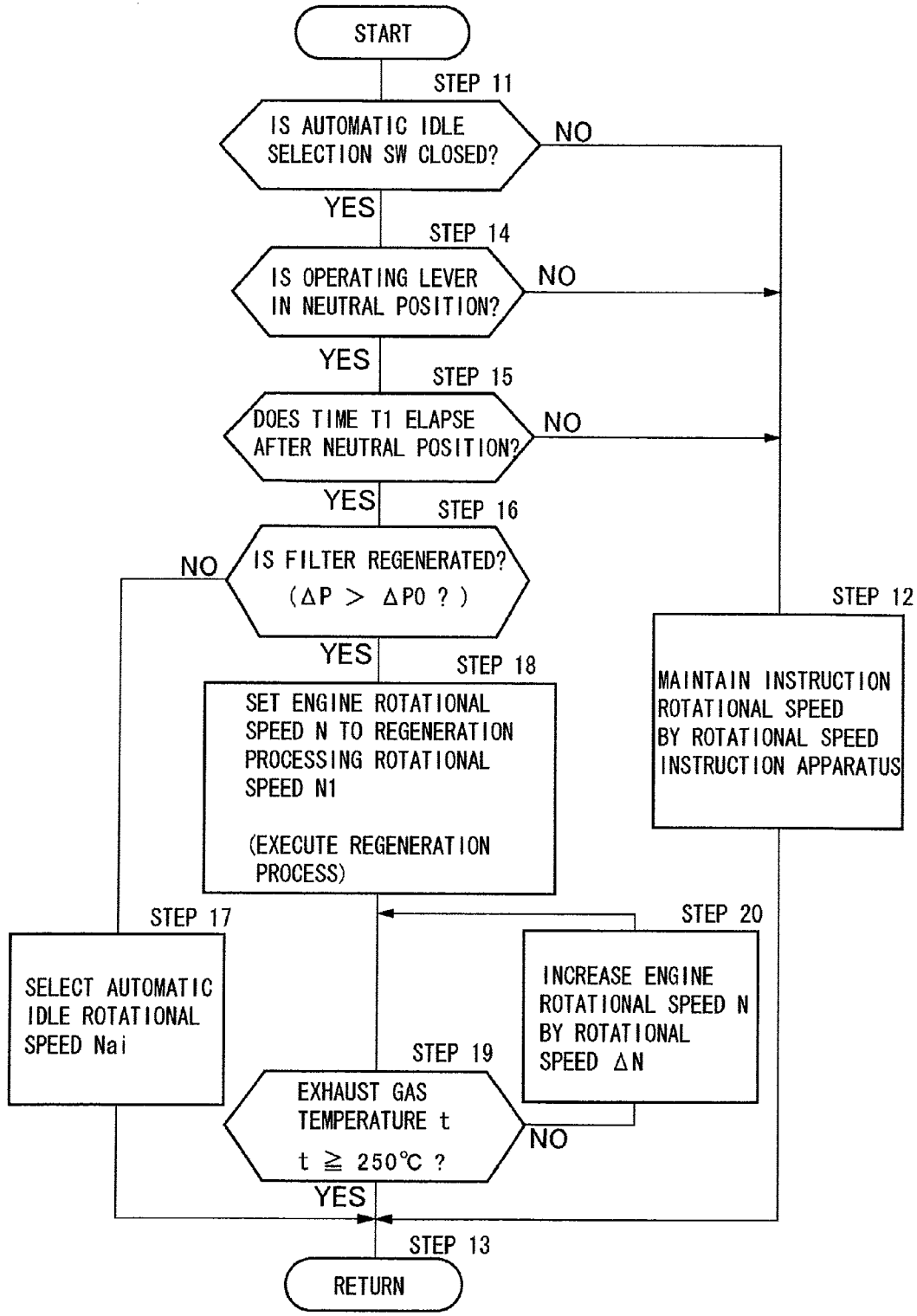
FIG. 7 is a flow chart showing automatic idle control and a filter regeneration process of an exhaust gas purifying apparatus according to a second embodiment.

Next, FIG. 7 shows a second embodiment in the present invention. In the present embodiment, component elements that are identical to those in the foregoing first embodiment will be simply denoted by the same reference numerals to avoid repetitions of similar explanations. However, the second embodiment is characterized in that at the time of executing the regeneration process to the exhaust gas purifying apparatus 16, the rotational speed of the engine 10 is gradually increased until the temperature t of the exhaust gas reaches the temperature (low-temperature regeneration temperature t1) for regeneration process.

Here, the engine control device 34, when the processing operation shown in FIG. 7 starts, executes processes from step 11 to step 13 as similar to the processes of step 1 to step 3 shown in FIG. 6 in the first embodiment. In addition, processes from step 14 to step 18 are executed as similar to the processes from step 5 to step 9 shown in FIG. 6. That is, in the second embodiment, since processes of step 19 and step 20 to be described later are executed, the process of step 4 shown in FIG. 6 can be unnecessary.

At step 18 shown in FIG. 7, as similar to step 9 shown in FIG. 6, the control of increasing the engine rotational speed N from the automatic idle rotational speed Nai to the regeneration processing rotational speed N1 is performed. At this time, the engine control device 34 executes the low-temperature regeneration process using the intake throttle valve 35 and/or the exhaust throttle valve 36. However, when the control process of such step 18 is only executed, in some cases the temperature t of the exhaust gas does not increase to the temperature for regeneration process (low-temperature regeneration temperature t1=250° C.). Therefore, at next step 19 it is determined whether or not the temperature t of the exhaust gas that is detected by the exhaust gas temperature sensor 21 reaches a temperature equal to or more than the low-temperature regeneration temperature t1 (t1=250° C.) (that is, t1≥250° C.).

When the determination of "NO" is made at next step 19, there are some cases where the temperature t of the exhaust gas does not reach the low-temperature regeneration temperature t1, and the particulate matter removing filter 19 in the exhaust gas purifying apparatus 16 cannot be regenerated. Therefore, at next step 20 the engine rotational speed N is controlled to increase in speed by a specified rotational speed ΔN (for example, 50 min$^{-1}$) that is in advance determined. As a result, as shown in the following formula 2, the engine rotational speed N gradually increases from the regeneration processing rotational speed N1, and increases in speed by repeating the process of step 20 by n times (n=1, 2, 3, ... ), for example.

$$N=N1+\Delta N \times n \qquad \text{[Formula 2]}$$

Thereby, when the determination of "YES" is made at step 19, at next step 13 the process returns, and the process after step 11 continues. Therefore, at step 18 after that, the engine rotational speed N is controlled to the regeneration processing rotational speed N1, and the low-temperature regeneration process is executed. That is, when a temperature t of the exhaust gas is equal to or more than the low-temperature regeneration temperature t1, and the regeneration apparatus (for example, the intake throttle valve 35 and/or the exhaust throttle valve 36) is used to execute the low-temperature regeneration process. As a result, the particulate matter that is deposited in the particulate matter removing filter 19 in the exhaust gas purifying apparatus 16 can be burned to regenerate the filter 19.

In this way, also in the second embodiment that is constituted as described above, the engine control device 34 can increase the temperature t of the exhaust gas to the low-temperature regeneration temperature t1 or more by the regeneration apparatus and can obtain the same effect as that of the first embodiment.

Particularly in the second embodiment, at the time of executing the regeneration process of the exhaust gas purifying apparatus 16, the rotational speed N of the engine 10 is increased for each specified rotational speed ΔN (for example, 50 min$^{-1}$) that is in advance determined until the temperature t of the exhaust gas reaches the low-temperature regeneration temperature t1 or more. Thereby, the temperature t of the exhaust gas is increased to the temperature necessary for regenerating the exhaust gas purifying apparatus 16, and the regeneration process of the exhaust gas purifying apparatus 16 can be executed at a temperature as low as possible.

Figure 8:
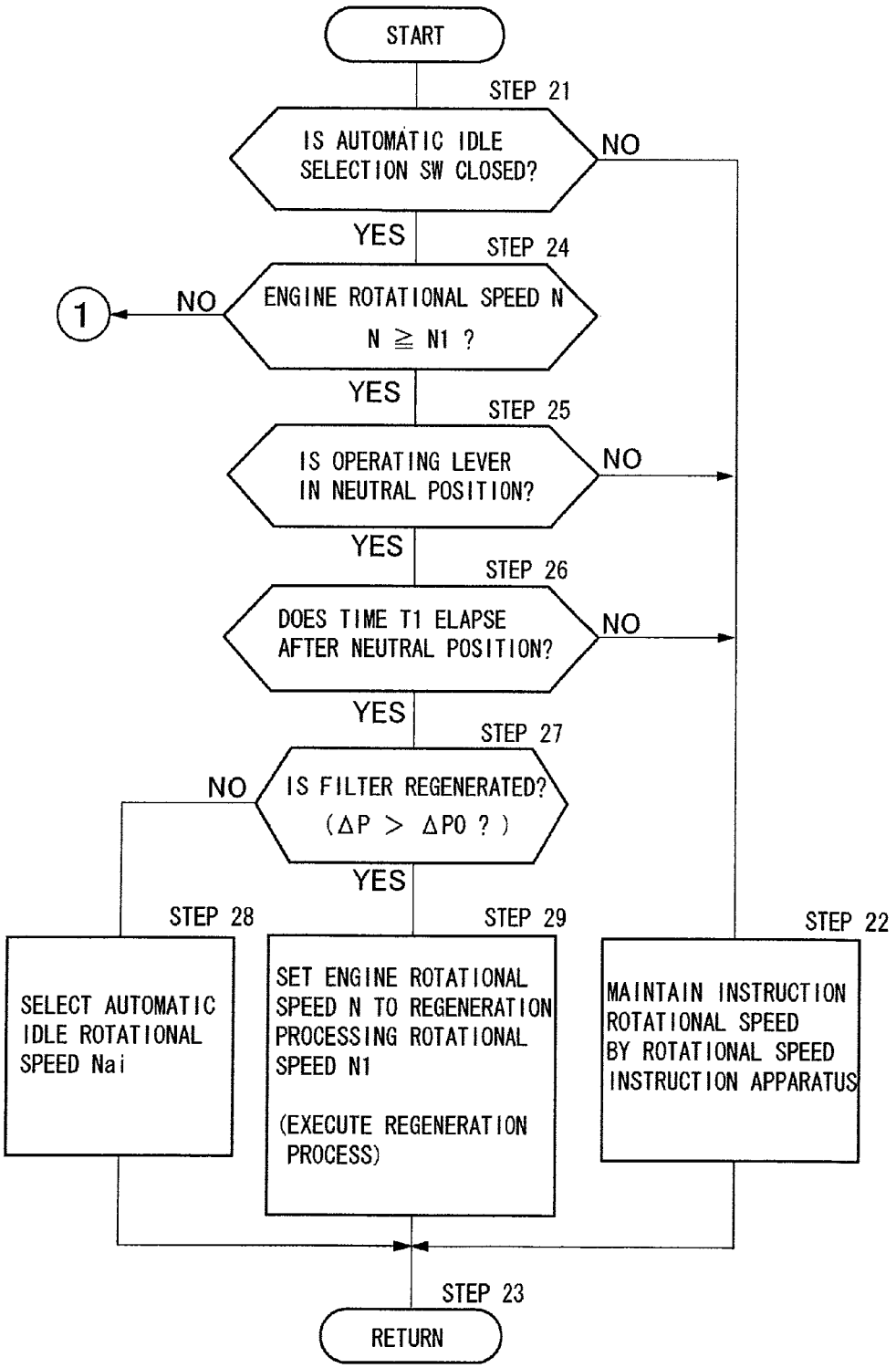
FIG. 8 is a flow chart showing automatic idle control and a filter regeneration process of an exhaust gas purifying apparatus according to a third embodiment.
Figure 9:
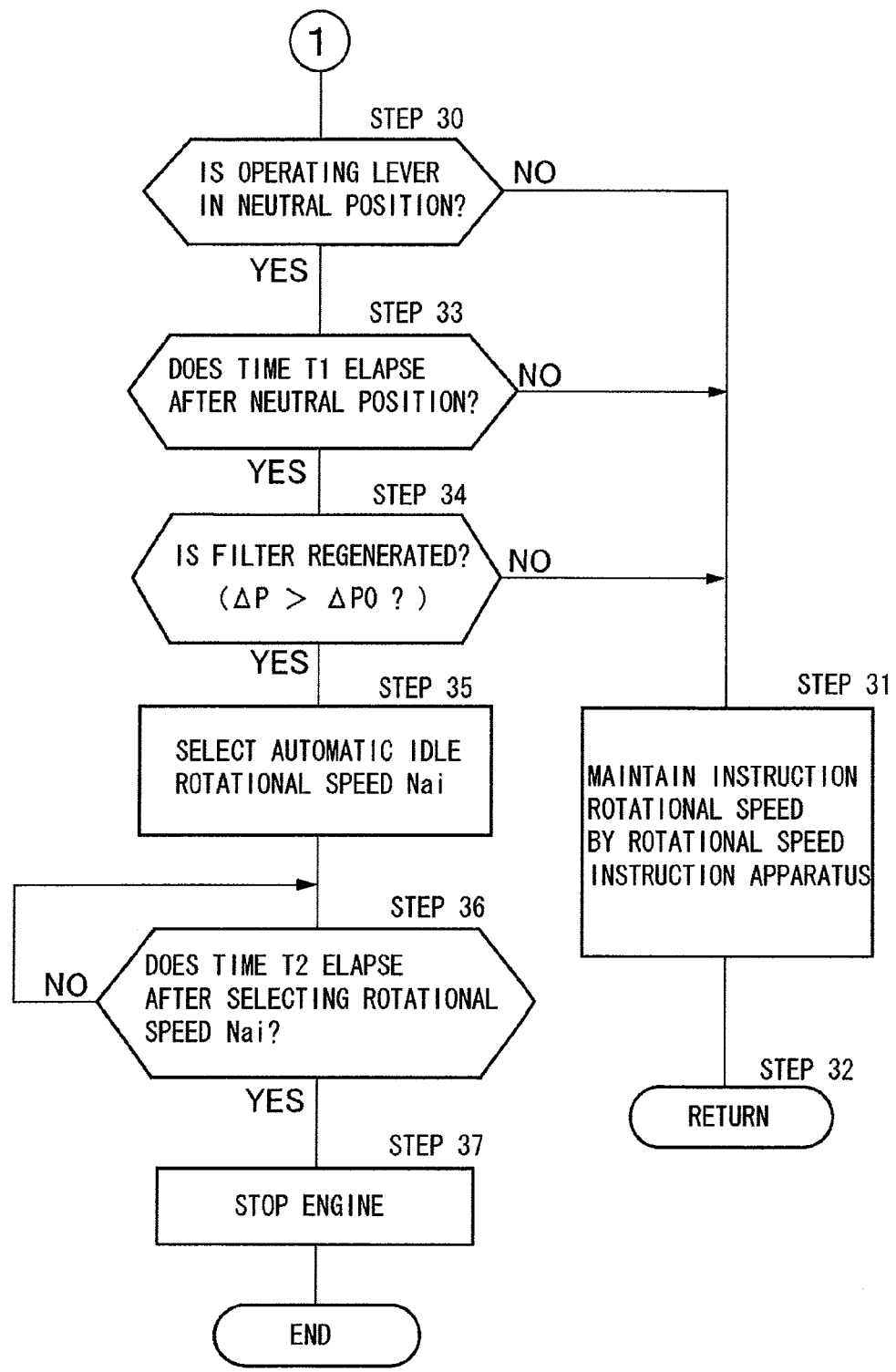
FIG. 9 is a flow chart showing the automatic idle control and the filter regeneration process of the exhaust gas purifying apparatus following FIG. 8.

Next, FIG. 8 and FIG. 9 show a third embodiment in the present invention. In the third embodiment, component elements that are identical to those in the foregoing first embodiment will be simply denoted by the same reference numerals to avoid repetitions of similar explanations. However, the third embodiment is characterized in that, for preventing the regeneration process of the exhaust gas purifying apparatus 16 from continuing to be executed in a low-rotational speed state of the engine 10 (that is, a rotational speed lower than the regeneration processing rotational speed N1), the engine 10 is stopped after the automatic idle control is performed over a predetermined time.

Here, when the processing operation shown in FIG. 8 starts, the engine control device 34 executes processes from step 21 to step 24 as similar to the processes from step 1 to step 4 shown in FIG. 6 according to the first embodiment. When the determination of "YES" is made at step 24, it is a case where an actual rotational speed (engine rotational speed N) that is detected by the rotational sensor 31 attached to the engine 10 is a rotational speed equal to or more than the regeneration processing rotational speed N1. Therefore, thereafter processes from step 25 to step 29 are executed as similar to the processes from step 5 to step 9 shown in FIG. 6.

However, according to the third embodiment, when the determination of "NO" is made at step 24, it is a case where the actual rotational speed (engine rotational speed N) that is detected by the rotational sensor 31 attached to the engine 10 is a rotational speed lower than the regeneration processing rotational speed N1. Therefore, there is a possibility that the regeneration process of the exhaust gas purifying apparatus 16 continues to be executed in a rotational speed lower than the regeneration processing rotational speed N1 of the engine 10.

Therefore, at step 30 to step 34 shown in FIG. 9, control processes similar to the processes from step 5 to step 7 shown in FIG. 6 as described above are executed. However, when the determination of "YES" is made at step 34, even if the particulate matter removing filter 19 in the exhaust gas purifying apparatus 16 will be processed to be regenerated, the actual rotational speed (engine rotational speed N) that is detected by the rotational sensor 31 of the engine 10 is the rotational speed lower than the regeneration processing rotational speed N1.

That is, when the determination of "YES" is made at step 34, the temperature t of the exhaust gas is hard to be increased to the low-temperature regeneration temperature t1 (for example, 250° C.). Therefore, the particulate matter that is deposited in the particulate matter removing filter 19 in the exhaust gas purifying apparatus 16 is not burned to be left, and it is possible to determine that the filter 19 cannot be regenerated.

Therefore, at next step 35 an automatic idle rotational speed Nai is selected as a target rotational speed of the engine 10 for performing the automatic idle control to perform the control of lowering the engine rotational speed N to the automatic idle rotational speed Nai. At next step 36 it is determined whether or not a predetermined time T2 that is in advance determined elapses after lowering the engine rotational speed N to the automatic idle rotational speed Nai. While the determination of "NO" is made at step 36 the process waits until the predetermined time T2 elapses.

When the determination of "YES" is made at step 36, the process transfers to next step 37, where the control of stopping the engine 10 is performed. This can prevent the regeneration process of the exhaust gas purifying apparatus 16 by the regeneration apparatus (for example, the intake throttle valve 35 and/or the exhaust throttle valve 36) from continuing to be wastefully executed in a rotational speed lower than the regeneration processing rotational speed N1 of the engine 10. That is, when the engine rotational speed N is lowered to the rotational speed lower than the regeneration processing rotational speed N1, the regeneration process to the particulate matter removing filter 19 in the exhaust gas purifying apparatus 16 is not appropriately executed, and as a result the deposit amount of the particulate matter and the unburned residues increases. Therefore, for preventing this problem, the engine rotational speed N is lowered to the automatic idle rotational speed Nai and based upon this state, the engine 10 is stopped, thus preventing the deposit of the particulate matter and the unburned residues.

In this way, the third embodiment that is thus constituted can also obtain the operational effect substantially similar to that of the first embodiment as described above. However, according to the third embodiment, at the time of controlling the rotational speed of the engine 10 to the automatic idle rotational speed Nai in a state where the actual rotational speed of the engine 10 that is detected by the rotational sensor 31 is a rotational speed lower than the regeneration processing rotational speed N1, the control of stopping the engine 10 is performed after the predetermined time T2 elapses. This can prevent the regeneration process of the exhaust gas purifying apparatus 16 from continuing to be executed in a low-rotational speed state of the engine 10 (state in a rotational speed lower than the regeneration processing rotational speed N1).

It should be noted that in the first embodiment, the process at step 7 shown in FIG. 6 is a specific example of the regeneration determining unit that is a constituent element in the present invention, and step 9 shows a specific example of the engine rotational speed increasing unit. Further, in the second embodiment, the process at step 16 shown in FIG. 7 is a specific example of the regeneration determining unit, and step 18 shows a specific example of the engine rotational speed increasing unit.

On the other hand, in the third embodiment, the process at step 24 shown in FIG. 8 is a specific example of the rotational speed determining unit, the process at step 27 shown in FIG. 8 and the process at step 34 shown in FIG. 9 are a specific example of the regeneration determining unit, and step 29 shows a specific example of the engine rotational speed increasing unit. In addition, the process at step 35 shown in FIG. 9 is a specific example of the idle rotational speed control unit, and the process at step 36 and the process at step 37 show a specific example of the engine stopping unit.

The first embodiment is explained by taking a case where at least one throttle valve of the intake throttle valve 35 that is provided in the intake side of the engine 10 and the exhaust throttle valve 36 that is provided in the exhaust side thereof is driven in a closing direction to execute the low-temperature regeneration process for increasing the exhaust gas temperature of the engine 10, as an example. However, the present invention is not limited to the same, and may be constituted such that the low-temperature regeneration process for increasing a temperature of the exhaust gas is executed by switching an injection pattern of fuel using an electronically controlled type fuel injection apparatus, for example. This respect is applied similarly to the second and third embodiments.

Further, each embodiment described above is explained by taking a case of mounting the exhaust gas purifying apparatus 16 on the small-sized hydraulic excavator 1 as an example. However, the construction machine provided with the exhaust gas purifying apparatus according to the present invention is not limited to the same, and, for example, the present invention may be applied to an intermediate-sized or larger-sized hydraulic excavator. Further, the present invention may also be applied widely to a construction machine of a hydraulic excavator that are provided with a lower traveling structure of a wheel type, a wheel loader, a fork lift, a hydraulic crane.

DESCRIPTION OF REFERENCE NUMERALS

1: Hydraulic excavator (Construction machine)
2: Lower traveling structure (Vehicle body)
4: Upper revolving structure (Vehicle body)
5: Working mechanism
6: Revolving frame (Frame)
9: Counterweight
10: Engine (Prime mover)
11: Intake pipe
12: Exhaust pipe
13: Hydraulic pump
15: Heat exchanger
16: Exhaust gas purifying apparatus
17: Casing
18: Oxidation catalyst (Catalyst unit)
19: Particulate matter removing filter (Particulate matter removing unit)
21: Exhaust gas temperature sensor (Temperature detector)
22, 23: Gas pressure sensor (Pressure detector)
24: Hydraulic actuator
25: Control valve (Directional control valve)
26: Pilot pump
27: Pilot operating valve
27A: Operating lever
28: Operation detector
29: Rotational speed instruction apparatus
30: Automatic idle selection switch (Automatic idle selection unit)
31: Rotational sensor
32: Control device
33: Vehicle body control device
34: Engine control device
35: Intake throttle valve (Regeneration apparatus)
36: Exhaust throttle valve (Regeneration apparatus)
37: Torque characteristics
38: Iso-exhaust gas temperature line in which an exhaust gas temperature is 250° C. at a regular operation
39: Iso-exhaust gas temperature line in which an exhaust gas temperature is 250° C. at a regeneration
40: Characteristics line
41: Operating point at a drag operation

The invention claimed is:

1. A construction machine comprising:
an engine (10) as a prime mover;
an exhaust gas purifying apparatus (16) that is provided in an exhaust side of said engine (10) to purify an exhaust gas;
a regeneration apparatus (35, 36) for executing a regeneration process to said exhaust gas purifying apparatus (16);
a hydraulic pump (13) that is driven by said engine (10) to suck operating oil in a tank and discharge pressurized oil;
at least one hydraulic actuator (24) that is driven by the pressurized oil discharged from said hydraulic pump (13);
a directional control valve (25) that is provided between said hydraulic actuator (24) and said hydraulic pump (13) to control supply of the pressurized oil to said hydraulic actuator (24);
a rotational speed instruction apparatus (29) that instructs a rotational speed (N) of said engine (10);
an automatic idle selection unit (30) configured to lower said rotational speed of said engine (10) to a predetermined automatic idle rotational speed (Nai); and
an engine control device (34) that regularly controls said rotational speed (N) of said engine (10) according to an instruction value by said rotational speed instruction apparatus (29) and, when said directional control valve (25) is in a neutral position, controls said rotational speed (N) of said engine (10) to said automatic idle rotational speed (Nai) by said automatic idle selection unit (30) regardless of said instruction value, characterized in that:
said engine control device (34) comprises:
a regeneration determining unit configured to determine whether or not said regeneration process to said exhaust gas purifying apparatus (16) is executed by said regeneration apparatus (35, 36), at the time of controlling said rotational speed (N) of said engine (10) to said automatic idle rotational speed (Nai) by said automatic idle selection unit (30); and an engine rotational speed increasing unit configured to increase said rotational speed (N) of said engine (10) to a regeneration processing rotational speed (N1) higher than said automatic idle rotational speed (Nai), when it is determined that said regeneration process is executed by said regeneration determining unit.

2. The construction machine according to claim 1, wherein when said rotational speed (N) of said engine (10) is increased to said regeneration processing rotational speed (N1), a temperature (t) of said exhaust gas is increased to a temperature (t1) necessary for said regeneration process of said exhaust gas purifying apparatus (16).

3. The construction machine according to claim 1, wherein a temperature detector (21) is provided in said exhaust gas purifying apparatus (16) for detecting a temperature (t) of said exhaust gas, and when said regeneration determining unit determines to execute said regeneration process, said engine rotational speed increasing unit in said engine control device (34) increases said rotational speed of said engine (10) until said temperature (t) of said exhaust gas reaches a temperature (t1) for said regeneration process.

4. The construction machine according to claim 1, comprising:

a rotational sensor (31) for detecting said rotational speed of said engine (10), wherein said engine control device (34) comprises:

a rotational speed determining unit configured to determine whether or not said rotational speed (N) of said engine (10) detected by said rotational sensor (31) is a rotational speed equal to or more than said regeneration processing rotational speed (N1);

an idle rotational speed control unit configured to control said rotational speed (N) of said engine (10) to said automatic idle rotational speed (Nai), when said rotational speed determining unit determines that said rotational speed (N) of said engine (10) is a rotational speed lower than said regeneration processing rotational speed (N1) and said regeneration determining unit determines to execute said regeneration process; and an engine stopping unit configured to perform control of stopping said engine (10) when a predetermined time (T2) elapses in a state where said rotational speed (N) of said engine (10) is controlled to said automatic idle rotational speed (Nai) by said idle rotational speed control unit.

5. The construction machine according to claim 1, wherein said regeneration apparatus executes a low-temperature regeneration process for increasing a temperature of said exhaust gas by a throttle valve (35, 36) that is provided in at least one of an intake side and an exhaust side of said engine (10).

* * * * *